United States Patent Office 3,273,348
Patented Sept. 20, 1966

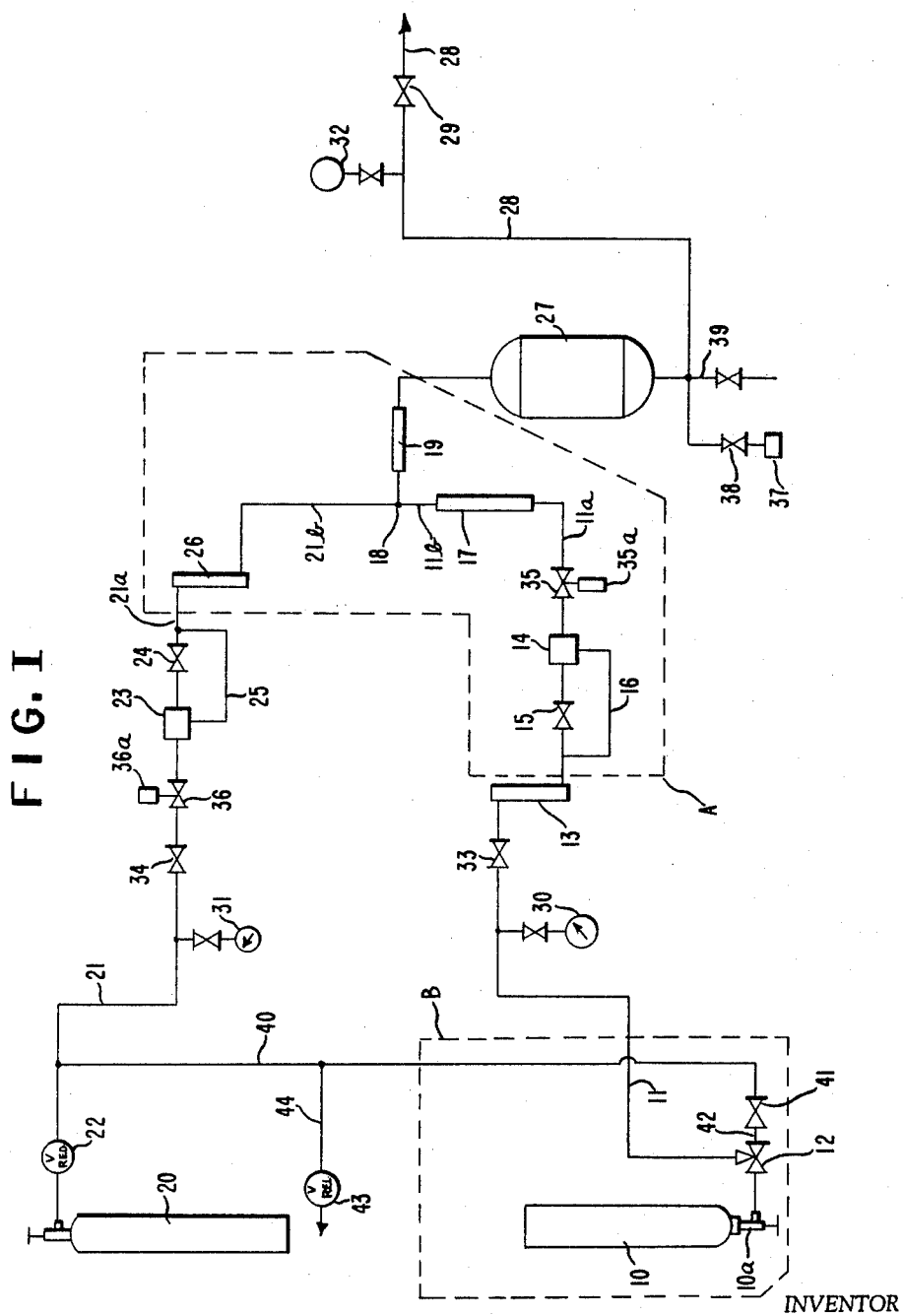
FIG. I
INVENTOR
JOHN W. DE HART, JR.

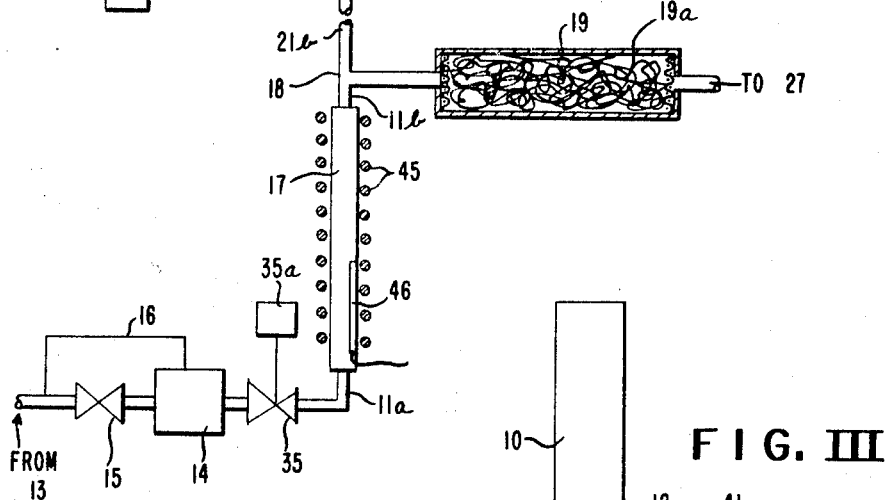

3,273,348
PROCESS AND APPARATUS FOR PREPARING
GASEOUS MIXTURES
John W. De Hart, Jr., Salem, N.J., assignor to E. I. du
Pont de Nemours and Company, Wilmington, Del., a
corporation of Delaware
Filed Mar. 28, 1963, Ser. No. 268,788
5 Claims. (Cl. 62—49)

This invention relates to a new and improved process for preparing gaseous mixtures in precisely controlled proportions of volatile or normally gaseous fluids which are readily liquefiable and of gases which are difficult to liquefy, and to novel apparatus especially adapted for use in such process.

There exists a commercial need for a process and apparatus for blending readily liquefiable fluids with gases that are difficult to liquefy in precisely controlled preselected proportions for a wide variety of purposes. The presently available methods and apparatus are cumbersome and the preparation of uniform and precise preselected mixtures has not been possible in simple, inexpensive and easily constructed apparatus. Such prior methods have included introducing weighed amounts of the two components into containers and allowing the mixture to stand until a uniform mixture is obtained. Such procedure is slow and time consuming. It has also been proposed to pass the gas through the liquid maintained at a specific temperature. However, such process has been limited in the range of proportions of the materials and the mixtures obtainable, particularly in high liquid content and are difficult to control. It has been further proposed to evaporate the less volatile material to a gas and then mix the two gaseous materials, measuring and controlling the rate of flow of both materials while in the gaseous state. Such process is limited in the total pressure range obtainable because the total system pressure cannot exceed the vapor pressure of the more readily liquefiable material and the system operates erratically so that the relative proportions of the two materials cannot be readily controlled to uniformly produce mixtures of desired precise proportions.

It is an object of this invention to provide an improved process for producing mixtures of readily liquefied fluids and gases in readily controlled, uniform, precise, preselected proportions under a wide range of pressures. Another object is to provide such a process which employs a supply of the easily liquefiable fluid under pressure in the liquid state and makes it possible to maintain the pressure of such supply while it is being consumed without requiring external means of applying pressure or encountering the problem of contamination of said fluid with undesired materials. A particular object is to provide novel apparatus, especially adapted for carrying out the foregoing process and accomplishing the above recited objects. Other objects are to advance the art. Still other objects will appear hereinafter.

The foregoing and other objects may be accomplished by the process, in the manner, and with the apparatus hereinafter more fully described, taken with the accompanying drawings which form a part of this disclosure.

Broadly, the invention includes the process for preparing a gaseous mixture of (1) a fluid having a normal boiling point in the range of −45° C. to +60° C. and a vapor pressure at 70° F. in the range of 4.4 to 140 p.s.i.a. and (2) a gas having a normal boiling point below −75° C. and a vapor pressure of at least about 200 p.s.i.a. at 70° F., in preselected proportions and under a pressure in the range of 1 to about 2000 p.s.i.g., which process comprises:
(A) providing a confined flowing stream of said fluid in liquid state while maintaining it under a pressure in the range of 11 to 2200 p.s.i.g. which is at least 10 p.s.i. above the preselected pressure for the product mixture and at least 1 p.s.i. above the vapor pressure of the fluid,
    (a) measuring the rate of flow of the fluid while it is in the liquid state,
    (b) controlling the flow of the liquid fluid at a predetermined rate,
    (c) then reducing the pressure of the fluid to about the preselected pressure for the product mixture,
    (d) completely vaporizing the fluid;
(B) simultaneously providing a separately confined flowing stream of said gas under a pressure at least equal to the pressure of said liquid fluid,
    (a) controlling the flow of the gas at a predetermined rate in a preselected proportion relative to the said fluid,
    (b) reducing the pressure of the gas to about the preselected pressure for the product mixture,
    (c) measuring the rate of flow of the gas; and
(C) then mixing said stream of gas with said stream of completely vaporized fluid.

The invention further includes a preferred form and arrangement of apparatus which is especially designed and constructed for use in preparing such gaseous mixtures by such process, which apparatus comprises:
(A) a fluid supply vessel in which said fluid is maintained in liquid state under a pressure which initially is in the range of 11 to 2200 p.s.i.g.,
    (a) said fluid supply vessel being connected in series, through fluid conducting conduits and valves carrying a stream of said fluid from said fluid supply vessel, to
    (b) a liquid flow measuring means,
    (c) differential pressure flow control means for controlling the rate of flow of the liquid fluid and for decreasing the pressure on the fluid by a predetermined amount,
    (d) a vaporizer for completely vaporizing the fluid,
    (e) a mixture for intimately mixing the vaporized fluid with said gas, and
    (f) a reservoir for the product mixture; and
(B) a gas supply vessel in which said gas is maintained under a pressure of from about 200 to about 2400 p.s.i.g. which is at least as high as the initial pressure in the supply vessel for said fluid,
    (a) said gas supply vessel being connected in series, through gas conducting conduits and valves carrying a stream of said gas from said gas supply vessel, to
    (b) differential pressure gas flow control means for controlling the rate of flow of the gas and for decreasing the pressure on the gas by a predetermined amount,
    (c) a gas flow measuring means, and
    (d) a junction with a conduit for the completely vaporized fluid positioned between said vaporizer and said mixer.

A further feature of the process comprises maintaining the required pressure in the vessel containing the supply of fluid in liquid state (as such fluid is withdrawn from such vessel) by introducing into said fluid supply vessel gas from the gas supply vessel as required to restore the pressure in the fluid supply vessel until the fluid therein is substantially exhausted. In the apparatus of the invention, this is accomplished by valve controlled gas conducting conduits which connect said fluid supply vessel with a gas stream flowing under pressure from the gas supply vessel without introducing such gas into the liquid stream flowing to the liquid flow measuring means.

By the process and the apparatus as above defined, employing the combination of steps and apparatus, particularly in the order defined, it has been found that the rates of flow of the fluid and of the gas can be readily and accurately controlled so as to uniformly produce gaseous mixtures of preselected precise proportions under a wide range of pressures. Such result is largely due to measuring and controlling the flow of the fluid in the liquid state rather than in the gaseous state. Also, by using the gas under pressure from the gas supply source to restore and maintain the pressure in the liquid supply source, the use of extraneous pressurizing expedients are avoided and the danger of introducing undesired contaminants into the gaseous product mixture is eliminated. Also, by such process and apparatus, it is possible to employ system pressures which are far greater than those which could be employed in prior processes and systems, the pressures in the present process and apparatus being limited by the available gas pressures and, in part, by the composition of the gaseous mixtures to be produced and temperature of operation. The various pieces of the apparatus are conventional and are readily available on the market. The apparatus is simple, readily constructed, inexpensive, and usually is sufficiently small and compact so that it can be mounted on a suitable base for ready transportation to different places of use.

This invention may best be understood by reference to the accompanying drawings in which:

FIGURE I is a plan view, illustrating diagrammatically a preferred form of the apparatus of this invention;

FIGURE II is a more detailed view of the portion of the apparatus in the area "A" of FIGURE I;

FIGURE III is a view of a modified form of the portion of the apparatus in area "B" of FIGURE I; and FIGURE IV is a view of a second modified form of the portion of the apparatus in area "B" of FIGURE I.

Referring more particularly to FIGURE I, a vessel 10, containing a supply of fluid in liquid form under a pressure greater than its vapor pressure which fluid has a normal boiling point in the range of from about —45° C. to about 60° C., is shown as a conventional liquefied gas cylinder in inverted position, but may be any other type of container, such as a commercial one-ton container. The vessel 10 is connected, through a three-way valve 12, to liquid feed line 11 and to pressurizing means.

The feed line 11 conducts the liquid to a liquid flow rate measuring means 13, shown conveniently as a conventional float type rotometer; and then to differential pressure flow control means 14 which, as shown, includes a small orifice type valve 15, e.g. a needle valve, and a pressure line 16, which differential pressure flow control means maintains a constant pressure drop across valve 15. Line 11a conducts the fluid from the differential pressure control means 14 to a vaporizer 17 which discharges through line 11b and junction 18 into mixer 19 and then into reservoir 27.

Referring particularly to FIGURE II, the vaporizer 17 is shown as a vertically mounted pipe surrounded by an external heater 45, preferably an electrical heater, to ensure complete vaporization of the liquid, and also preferably provided with a thermocouple 46 to measure the temperature in the vaporizer, the vaporizer being positioned below junction 18 and the liquid being fed into the lower end of the vaporizer. This arrangement is preferred since unvaporized liquid tends to run back into the vaporizer. Packing or fins may be included within the vaporizer, if desired, to increase heat transfer. Positions other than vertical may be used, especially with packing or fins. Electrical heaters are preferred, although steam, hot water or the like may also be used.

To obtain the best results, the mixer 19 must insure turbulent flow. This may be accomplished by means of a packing 19a, as shown in FIGURE II, or with fins, restrictions or any other means known for causing turbulent flow without excessive pressure drop across the mixer.

For purposes of safety and convenience of operation, liquid feed line 11 may be provided with a pressure gauge 30 and an isolation valve 33, preceding the liquid flow measuring means 13, for isolating the liquid feed means from the rest of the system. Also, preferably, a valve 35, shown as actuated by a solenoid 35a, is placed in line 11a following the differential pressure control means 14 to stop the flow of fluid if the pressure in reservoir 27 should exceed a preset maximum.

A vessel 20, containing a supply of a gas having a normal boiling point below —75° C. and which is under a pressure at least equal to the initial pressure in vessel 10, is shown as a conventional compressed gas cylinder, but any other source of the gas at the desired pressure can be used. The vessel 20 is connected to gas feed line 21 through a pressure reducing valve 22. The gas feed line 21 conducts the gas to a differential pressure flow control means 23 which, as shown, includes a small orifice type valve 24, e.g. a needle valve, and a pressure line 25, which differential pressure flow control means maintains a constant pressure drop across valve 24. Line 21a conducts the gas from the differential pressure flow control means 23 to a gas flow rate measuring means 26, shown conveniently as a conventional float type rotometer, from which the gas is conducted through line 21b to junction 18, where the gas joins the vaporized fluid from vaporizer 17 and flows therewith through mixer 19 and into reservoir 27, from which the gaseous mixture is drawn off as desired through discharge line 28 and shut-off valve 29 to any apparatus, container, or the like where the gaseous mixture is to be used or stored.

For purposes of safety and convenience, gas feed line 21 may be provided with a pressure gauge 31, and an isolation valve 34 for isolating the gas feed from the rest of the system. Also, discharge line 28 may be provided with a pressure gauge 32. Preferably also, line 21 will be provided with a solenoid 36a actuated valve 36, preceding the differential pressure control means 23. Solenoids 35a and 36a will be actuated by pressure responsive switch 37, which is connected to reservoir 27 through valve 38, to close valves 35 and 36 when the pressure in the reservoir exceeds a preset maximum. Also, reservoir 27 may be provided with a valved drain line 39 to drain off any contaminant liquids or for cleaning out the system when desired.

A particularly desirable feature of the apparatus of this invention comprises a means for pressurizing or repressuring the liquid in vessel 10 from the vessel 20. Such means comprises a line 40 leading from gas feed line 21, downstream from pressure reducing valve 22, to valve 41 which is connected to vessel 10 through a short line 42 and valve 12. Line 40 may be provided with a line 44 and a vent or pressure relief valve 43 to relieve any excess pressure that might accidentally accumulate in the gas feed line and system.

Referring particularly to FIGURE III, three-way valve 12 and valve 41 are provided with solenoids 12a and 41a, respectively, to operate such valves, as desired.

Referring particularly to FIGURE IV, three-way valve 12 is replaced by a "T" connection 47 and a valve 48. Valves 41 and 48 may be operated manually or mechanically with solenoids.

In the operation of the apparatus, the fluid in vessel 10 will have a normal boiling point of from about —45° C. to about 60° C. and a vapor pressure at 70° F. of from about 4.4 to about 140 p.s.i.a. and will be at a pressure of from about 11 p.s.i.g. to about 2200 p.s.i.g. and at least 1 p.s.i. above its vapor pressure at the temperature of operation which usually will be normal room temperature, whereby said fluid will be in liquid form. The practical limits of useful pressures in reservoir 27 are from 1 p.s.i.g. to about 2000 p.s.i.g., the particular pressure employed therein being that at which it is desired to discharge the gaseous mixture for the particular purpose. To ensure flow of the fluid through the system, the pressure in vessel 10 should exceed by at least about 1 p.s.i. the pressure in reservoir 27 plus the pressure drop across control means 14 and the pressure drops across valves 12, 15, 33 and 35, flowmeter 13, vaporizer 17, mixer 19, and the connecting lines. With the exception of the pressure drop across control means 14–15, all of the pressure drops are very small. In order to maintain the fluid in the liquid state until it reaches valve 15, the pressure in vessel 10 should be at least 1 p.s.i. above the vapor pressure of the fluid, so as to allow for the pressure drops in the equipment which precedes valve 15. Thus, the pressure in vessel 10 will be dependent upon the desired pressure in the reservoir 27 and the pressure drop desired across control means 14–15, and will be further limited by the vapor pressure of the fluid, being sufficient to maintain said fluid in the liquid state until it reaches valve 15. Thereby, said fluid will flow as a liquid under said pressure through the three-way valve 12 and flow meter 13 to differential pressure flow control means 14–15. The differential pressure flow control means will be adjusted to provide a constant pressure drop in the range of from about 10 to about 200 pounds, usually from about 50 to about 200 pounds, sufficient to reduce the pressure of the fluid to from 1 p.s.i.g. to about 2000 p.s.i.g. as the fluid flows through said means. In some cases, some vaporization of the liquid may take place due to such pressure drop. The fluid then flows into vaporizer 17 where it is completely vaporized.

For many purposes, such as charging aerosol type containers with the gaseous mixture to be used as a propellent for various materials which are to be discharged from the containers as sprays or foams, the pressure in the reservoir 27 usually will be in the range of from about 25 p.s.i.g to about 150 p.s.i.g. Under such circumstances, the liquid in vessel 10 usually will be under a pressure of from about 35 p.s.i.g. to about 300 p.s.i.g., and the pressure drop across the differential pressure flow control means 14–15 usually will be from about 10 p.s.i. to about 150 p.s.i. Most preferably, the pressure in reservoir 27 will be about 125 p.s.i.g., the pressure in vessel 10 will be about 300 p.s.i.g., and the pressure drop across the differential pressure control means will be about 75 p.s.i.

The gas in vessel 20 will have a normal boiling point below −75° C. and a vapor pressure at 70° F. greater than 200 p.s.i.a., and will be at a pressure greater than that of the fluid in vessel 10, usually from about 200 to about 2400 p.s.i.g. Many gases, such as nitrogen, oxygen, argon, helium, hydrogen, carbon monoxide, methane, and carbon tetrafluoride, are available commercially in cylinders at pressures of about 1800 to about 2400 p.s.i.g., and such a cylinder can be used as vessel 20. Such gas will flow through reducing valve 22 where the pressure will be reduced to about equal that in line 11. The gas will then flow through differential pressure flow control means 23–24, which produces a constant pressure drop about equal to that provided by the control means 14–15, whereby the pressure in line 21a will be about equal to that in line 11a. The gas will then flow through gas flow meter 26 and conduit 21b, and will mix with the vaporized fluid from 17 to 18. The gaseous mixture will pass into mixer 19, and then into reservoir 27, where it is available to be discharged from the apparatus as desired via line 28 and valve 29. The chief use of reservoir 27 is to maintain a reasonable constant pressure within the system. This is particularly useful when the gas mixture is withdrawn from the apparatus intermittently.

It is important for smooth operation of the apparatus that the liquid flow rate measuring means 13 precede the differential pressure liquid flow control means 14–15. If the order of these parts of the apparatus is reversed, the apparatus will function erratically. It is generally preferable, but not required, to have gas flow meter 26 follow differential pressure gas flow control means 23–24 in order to reduce the pressure requirements of the gas flow meter 26.

As liquid is withdrawn from vessel 10 during the operation, the pressure in the vessel tends to drop gradually, and usually will tend to drop below the required minimum pressure while a considerable amount of the fluid remains in the vessel. In order to maintain the desired pressure in vessel 10 and in line 11, etc. until the supply of fluid in the vessel is substantially exhausted, it is necessary to periodically repressurize the vessel 10, i.e. to restore the pressure therein. This is accomplished by switching valve 12 to disconnect vessel 10 from meter 13 and to connect vessel 10 to valve 41. Valve 41 is then opened and some of the gaseous fluid from vessel 20 passes into vessel 10, through the body of liquid, and into the vapor space above the body of liquid, whereby the gas pressure will be applied to the upper surface of the liquid. When the desired pressure is attained in vessel 10, valve 41 is again closed and valve 12 again connects vessel 10 to flow meter 13. This repressuring of vessel 10 should be done as rapidly as possible to avoid upsetting the system with the liquid flow cut off. Meanwhile, gas from vessel 20 is permitted to continue to flow through the gas feed system, line 21 et seq., because the liquid feed system, line 11 et seq., is liquid full and some liquid continues to flow through valve 15.

The flow of liquid from vessel 10 increases the vapor space in the vessel, resulting in a gradual decrease in the pressure therein. Ordinarily, the pressure in the vessel 10 will be permitted to drop by 0.25 to about 1 p.s.i., preferably by about 0.5 to about 1 p.s.i, between repressurings. With a 1 p.s.i drop in pressure, repressuring requires about 2 seconds, on an average. If the pressure is permitted to drop much more than 1 p.s.i., repressuring requires a longer time and the measuring means tend to operate erratically. Where the total added pressure is small, one p.s.i. minimum, smaller drops in pressure, 0.25 to about 0.5 p.s.i., should be used.

In the modification shown in FIGURE III, the valves 12 and 41 are operated by solenoids 12a and 41a. In the unenergized position, valve 12 is open to pass the liquid from vessel 10 to flow meter 13, and valve 41 is closed. When repressurization is required, valve 12 is energized which connects vessel 10 with valve 41. Valve 41 is then energized, allowing gas to pass from vessel 20 and line 21 through line 40 into vessel 10 until the desired pressure is reached. These valves may be operated manually, on a time cycle (i.e. one second each two minutes by means of a timing device), or by means of a pressure sensing means (not shown) either between vessel 10 and valve 12 or in the vapor space of vessel 10 which activates the valves when a preset minimum pressure is reached. If valve 12 can hold back pressure in both directions so that gas will not leak into the liquid line 11, valve 41 can be eliminated. Valve 41 is generally preferred however because not all three-way valves will hold back pressure in both directions equally well and valve 41 insures that no gas gets into the liquid line 11 or liquid into the repressurizing line 40. When both valves are used, it is preferable to keep the connecting line 42 between valves 12 and 41 as short as possible. Occasionally, it is of advantage to apply a small amount of heat to the vapor space of vessel 10, especially when vessel 10 is nearly empty, to insure a steady flow of liquid and to overcome cooling at the vessel valve 10a. Care should be taken not to overheat the vessel 10.

In the modification shown in FIGURE IV, valve 48 normally is open and valve 41 is closed. When repressurization is required, valve 48 is closed and then valve 41 is opened. Time cycles or pressure sensing devices may be used also in this modification. To prevent gas from collecting between connection 47 and valve 48, valve 48 is preferably mounted vertically below connection 47.

The differential pressure flow control means 14–16 and 23–25 are preferred. However, other systems, such as variable orifice control valves with differential pressure cell controllers connected to maintain constant pressure drop across the valves, may also be used. Whatever type of flow control means is used in the liquid line, care must be taken to prevent vapor locks from vaporization in the control system. Naturally, where a pressure drop occurs, some vaporization can take place.

The control valves, 35 in FIGURES I and II and 36 in FIGURE I, are actuated by means of pressure switch 37. The valves 35 and 36 are preferably solenoid operated so as to be open in the energized position. Exess pressure in reservoir 27 closes switch 37, deenergizing solenoids 35a and 36a and closing valves 35 and 36. Also, in case of power failure, solenoids 35a and 36a are deenergized and valves 35 and 36 are automatically closed, shutting down the system.

The angle, between the flow of gas and vaporized liquid at junction 18, is not critical, but is more conveniently between 0° and 90°, and is most easily made 90°.

Piping, tubing and other specified and unspecified parts of the apparatus are standard items of commerce. These are chosen to be able to resist the expected pressures with a safety factor, to be nonreactive with the fluids and gases being mixed, and (except for those items designed to produce drops in pressure) to be of sufficient size to cause minimum pressure drop in the system. Generally steel, stainless steel, or brass pipe or fittings and stainless steel or copper tubing are quite suitable. The various pieces of equipment, particularly the flow meters, flow control means, vaporizers, mixers and reservoirs, are available in various sizes and forms, and the particular sizes and forms will be chosen according to the desire of the user and particularly to provide the capacities desired. For most purposes, the equipment is sufficiently small so that all of the apparatus, except vessels 10 and 20, can be mounted on a board or other suitable base so that the assembly can be readily transported as a whole to various places of desired use.

It is understood that the flow meters 13 and 26 will be chosen to include the desired range of flow rates and must be calibrated individually for each fluid component used in the apparatus. The composition of the mixture obtained is controlled by adjusting the flow of each fluid component to obtain the relative proportions desired and the total amount needed. Hence, not only the composition of the mixture, but also the quantity of the mixture can be controlled with the present apparatus. If desired, the composition of the resulting gas mixture can be determined by using standard methods of gas analysis as a check against the calibrations of the flow meters.

The size of reservoir 27 may be small where the gaseous mixture is continuously withdrawn from the system, or relatively large where the mixture is withdrawn intermittently as in aerosol can filling or like operations. In the former case, it may be only of sufficient size to provide a buffer zone against normally expected fluctuations in the rate of withdrawal of the gaseous mixture. In the latter case, the reservoir 27 should be of sufficient capacity, say about 10 times the volume of gas withdrawn at any one time, so that the intermittent withdrawal of gas does not markedly decrease the pressure in the system which would upset the measuring devices.

Although they are not essential to the operability of the apparatus, the two valves 35 and 36, operating in conjunction with pressure switch 37, are very useful when the apparatus is used for irregular service. With this refinement, the reservoir 27 is allowed to fill to the maximum desired pressure (which is determined by the materials being mixed and the subsequent use of the mixture) whereupon valves 35 and 36 close automatically. When material is withdrawn from reservoir 27, the pressure drops, valves 35 and 36 open, and the reservoir is brought to maximum pressure again. With regular intermittent service where material is withdrawn at relatively even intervals from reservoir 27, valves 35 and 36 are of less value since it is simple procedure to balance the flow of materials into reservoir 27 with the rate of withdrawal of material from the reservoir with minimum pressure variations. Valves 35 and 36 are useful even here, since they will shut down the system automatically if, for some external reason, the regular withdrawal of material from reservoir 27 is interrupted or a power failure occurs.

Valve 29 allows the entire apparatus to be isolated without contamination by external materials or loss of pressure, if it is necessary to disconnect the apparatus from the system in which the gaseous mixture is to be used. Valves 33 and 34 allow each of the two feed systems to be isolated from the remainder of the apparatus without contamination of the system as, for example, when it is necessary to replace vessels 10 or 20.

Where vessel 10 is a commercial one-ton container, which usually has separate outlets for liquid and gaseous material, valve 48 of FIGURE IV will be connected to the liquid outlet, valve 41 will be connected to the gas outlet and the "T" connection 47, no longer being necessary, will be omitted. Repressurization will be carried out in the same manner as previously described however. Indeed, the only requirement of vessel 10 is that the fluid therein is maintained under the desired pressure and is removed in the liquid phase, and that gas pressure from vessel 20 can be applied to the liquid in vessel 10.

In principle, there are few limitations on the apparatus. The operating pressure of the system can be no higher than the available pressure of the gas or the weakest component of the apparatus. Ordinarily, the process and apparatus will be operated at normal room temperatures, about 70° F. (25° C.), but higher or lower temperatures may be employed, if desired. The partial pressure of the fluid component in the product mixture cannot exceed the vapor pressure of the fluid at the operating temperature of the system. The partial pressure of this component is equal to the product of the total pressure of the mixture and the mole fraction of that component in the mixture. For example, mixtures of nitrogen (gas) with 8.42 mole percent ammonia, 0.29 mole percent bromine, or 4.64 mole percent octafluorocyclobutane (fluids) are gaseous at 25° C. under 2000 p.s.i., since the partial pressures of said fluid components in such mixtures do not exceed the vapor pressure of these fluids at 25° C. If the partial pressure of the fluid component of a particular desired mixture exceeds the vapor pressure of the fluid at one operating temperature or pressure, such mixture can be obtained by lowering the operating pressure or increasing the operating temperature or both.

Pressurizing the liquid in the liquid supply vessel with the gas under pressure above the body of the liquid is a distinct advantage of the present process and apparatus since no contaminants are introduced in the mixture thereby. This is particularly important in situations where contamination cannot be tolerated, such as in the preparation of gaseous mixtures which are to be used in connection with materials for human consumption, for dielectric purposes, and the like.

Gaseous mixtures of three or more components can be prepared, such as mixtures containing two or more readily liquefiable fluids, two or more difficultly liquefiable gases, and the like, by employing such mixtures in the fluid supply vessel or the gas supply vessel, respectively, or by modification of the apparatus by adding supply vessels for such additional components, together with the required measuring and flow control equipment according to the principles of this invention, so as to introduce such components with the others into the mixing equipment.

The fluids, which may be used in this invention, have normal boiling points (i.e., at 1 atmosphere pressure) in the range of −45° C. to +60° C. and vapor pressures at 70° F. (25° C.) in the range of 4.4 to 140 p.s.i.a., and include readily liquefiable gases and easily vaporized liquids, which are usually handled as liquids. Such fluids include such well known industrial materials as ammonia, chlorine, bromine, methyl chloride, ethyl chloride, methyl ether, methyl ethyl ether, diethyl ether, methyl mercaptan, phosgene, sulfur dioxide, chlorodifluoromethane, chloropentafluoroethane, dichlorodifluoromethane, octafluorocyclobutane, dichlorotetrafluoroethane, monofluorodichloromethane, monofluorotrichloromethane, trichlorotrifluoroethane, and sulfur hexafluoride. While sulfur hexafluoride has a boiling point and sublimes below its melting point at 1 atmosphere, it is known that it exists as a liquid at temperatures above its melting point when maintained under pressure.

The gases, which may be used in this invention, have normal boiling points (i.e., at 1 atmosphere) below $-75°$ C. and a vapor pressure of at least about 200 p.s.i.a. at 70° F. (25° C.). Such gases include the so-called permanent gases argon, helium, zenon, neon, krypton, oxygen, nitrogen, air, hydrogen, and carbon monoxide, as well as the well known acetylene, carbon dioxide, ethane, ethylene, hydrogen chloride, methane, nitrous oxide, phosphine, carbon tetrafluoride, trifluoromethane, chlorotrifluoromethane, and hexafluoroethane.

In general, the process and apparatus of the present invention are useful in any situation where a gaseous mixture of the type defined is required. Some typical examples are gaseous mixtures to be used as propellents for self-propelling sprays, foams and the like, which are maintained under pressure in aerosol-type cans; dielectric gas mixtures; anesthetic mixtures; chemical process streams; and the like. The invention is particularly useful for the preparation of gaseous mixtures for pneumatic springs, such as those disclosed by Eiseman, Jr. in U.S. Patent 2,999,680; and for preparing gaseous mixtures for use as propellents for self-propellent sprays and foams, particularly such as those disclosed by Hill, Jr., in U.S. Patent 2,952,547, by Webster in U.S. Patent 3,072,487, and by Young in U.S. Patent 2,849,323; especially for preparing gaseous mixtures of octafluorocyclobutane with one or more of nitrous oxide, carbon dioxide, and nitrogen, which are useful as propellents and dielectric gases. Other representative mixtures are gaseous mixtures of nitrogen and sulfur hexafluoride which are useful as dielectrics; gaseous mixtures of carbon monoxide and chlorine which are used to prepare phosgene; and the like.

In order to more clearly illustrate this invention, a preferred mode and apparatus for carrying it into effect, and the advanageous results to be obtained thereby, the following example is given:

EXAMPLE

The apparatus employed was that shown in FIGURES I and II which included specific components having the following specifications: liquid flow meter 13, 75 cc. water per minute capacity (Brooks, Model 1110, #4 size, 150 mm. scale Tube #4-15-2, Pyrex Float); gas flow meter 27 of 5.88 s.c.f.m. (standard cubic feet per minute) capacity (Model 1000 Brooks Rotometer, size 8); liquid feed controller 14 (Moore Products type 63-SU-L flow controller) with valve 15 the required Moore needle valve; gas feed controller 23 (Moore Products type 63-BD) with valve 24 a modified Moore needle valve; mixer 19, a ½" diameter x 5" long pipe fitted at each end with ¼" to ½" pipe reducing couplings with screens inserted between the ends of the ½" pipe and the internal faces of the couplings and the space between the screens filled with shredded polytetrafluoroethylene; vaporizer 17, a ½" diameter x 18" long pipe heated at 40° C.–60° C.; and reservoir 27, a 1000 cubic inch stainless steel tank. Such apparatus, except for the vessels 10 and 20, were mounted on a board so that they could be transported readily to different places of use.

This apparatus was used to prepare mixtures of octafluorocyclobutane and nitrous oxide for use as an aerosol propellant as described by Hill, Jr., in U.S. Patent 2,952,547. The vessel 10 was filled with octafluorocyclobutane at about 200 p.s.i.g. and vessel 20 contained nitrous oxide at about 805 p.s.i.g. The pressure within the system as measured at pressure gauges 30 and 31 was maintained at 200 p.s.i.g. The vessel 10 was repressured on a time cycle of an average of about 2 seconds repressuring each 2 minutes, the drop of pressure in the vessel between repressuring being about 1 p.s.i. Due to the pressure drops across control means 14–15 and 23–24, the pressure measured at gauge 32 was 125 p.s.i.g. Line 28 was connected to a commercial aerosol can filling machine, and mixtures of octafluorocyclobutane in nitrous oxide were obtained in sufficient quantity to fill 5000 aerosol cans per hour. The concentration of the octafluorocyclobutane in the mixtures was readily controlled in preselected proportions over the range of from about 7% to about 24% by weight, as desired.

It will be understood that the preceding example and the specific form of apparatus described in detail and shown in the drawings are given for illustrative purposes solely and that this invention is not limited to such specific embodiments. On the other hand, it will be understood that, subject to the limitations set forth in the general description, considerable variations can be made in the process, the apparatus, the materials, proportions and conditions employed, without departing from the spirit or scope of this invention.

From the foregoing description, it will be apparent that this invention provides a new and improved process for preparing gaseous mixtures of volatile, readily liquefiable fluids and difficultly liquefiable gases in uniform, precise and readily controlled preselected proportions and hence solves an existing problem in the art. Also, this invention provides novel apparatus which is particularly designed and adapted for use in the foregoing process and which is simple and economical in construction and is particularly effective for the purpose. Accordingly, it will be apparent that this invention constitutes a valuable advance in and contribution to the art.

The embodiments of the invention in which an exclusive property or privilege is claimed are defined as follows:

1. Apparatus for preparing a gaseous mixture of (1) a fluid having a normal boiling point in the range of $-45°$ C. to $+60°$ C. and a vapor pressure at 70° F. in the range of 4.4 to 140 p.s.i.a. and (2) a gas having a normal boiling point below $-75°$ C. and a vapor pressure of at least about 200 p.s.i.a. at 70° F., in preselected proportions under a pressure in the range of 1 to about 2000 p.s.i.g., which apparatus comprises
  (A) a fluid supply vessel in which said fluid is maintained in liquid state under a pressure which initially is in the range of 11 to 2200 p.s.i.g.,
    (a) said fluid supply vessel being connected in series, through fluid conducting conduits and valves carrying a stream of said fluid from said supply vessel, to
    (b) a liquid flow measuring means,
    (c) differential pressure flow control means for controlling the rate of flow of the liquid fluid and for decreasing the pressure on the fluid by a predetermined amount,
    (d) a vaporizer for completely vaporizing the fluid,
    (e) a mixer for intimately mixing the vaporized fluid with said gas, and
    (f) a reservoir for the product mixture; and
  (B) a gas supply vessel in which said gas is maintained under a pressure of from about 200 to about 2400 p.s.i.g. which is at least as high as the initial pressure in the supply vessel for said fluid,
    (a) said gas supply vessel being connected in series, through gas conducting conduits and valves carrying a stream of said gas from said gas supply vessel, to
    (b) differential pressure gas flow control means for controlling the rate of flow of the gas and for decreasing the pressure on the gas by a predetermined amount, (c) a gas flow measuring means, and
(d) a junction with a conduit for the completely vaporized fluid positioned between said vaporizer and said mixer.

2. Apparatus for preparing a gaseous mixture of (1) a fluid having a normal boiling point in the range of −45° C. to +60° C. and a vapor pressure at 70° F. in the range of 4.4 to 140 p.s.i.a. and (2) a gas having a normal boiling point below −75° C. and a vapor pressure of at least about 200 p.s.i.a. at 70° F., in preselected proportions under a pressure in the range of 1 to about 2000 p.s.i.g., which apparatus comprises (A) a fluid supply vessel in which said fluid is maintained in liquid state under a pressure which initially is in the range of 11 to 2200 p.s.i.g.,
  (a) said fluid supply vessel being connected in series, through fluid conducting conduits and valves carrying a stream of said fluid from said fluid supply vessel, to
  (b) a liquid flow measuring means,
  (c) differential pressure flow control means for controlling the rate of flow of the liquid fluid and for decreasing the pressure on the fluid by a predetermined amount,
  (d) a vaporizer for completely vaporizing the fluid,
  (e) a mixer for intimately mixing the vaporized fluid with said gas, and
  (f) a reservoir for the product mixture;
(B) a gas supply vessel in which said gas is maintained under a pressure of from about 200 to about 2400 p.s.i.g. which is at least as high as the initial pressure in the supply vessel for said fluid,
  (a) said gas supply vessel being connected in series, through gas conducting conduits and valves carrying a stream of said gas from said gas supply vessel, to
  (b) differential pressure gas flow control means for controlling the rate of flow of the gas and for decreasing the pressure on the gas by a predetermined amount,
  (c) a gas flow measuring means, and
  (d) a junction with a conduit for the completely vaporized fluid positioned between said vaporizer and said mixer; and
(C) means for repressurizing said fluid supply vessel as required to restore the pressure therein when that pressure drops by 0.25 to about 1 p.s.i., which means include
  (a) valve controlled gas conducting conduits connecting said fluid supply vessel with the gas stream flowing under pressure from said gas supply vessel.

3. Apparatus for preparing a gaseous mixture of (1) a fluid having a normal boiling point in the range of −45° C. to +60° C. and a vapor pressure at 70° F. in the range of 4.4 to 140 p.s.i.a. and (2) a gas having a normal boiling point below −75° C. and a vapor pressure of at least about 200 p.s.i.a. at 70° F., in preselected proportions under a pressure in the range of 1 to about 2000 p.s.i.g., which apparatus comprises (A) a fluid supply vessel in which said fluid is maintained in liquid state under a pressure which initially is in the range of 11 to 2200 p.s.i.g.,
  (a) said fluid supply vessel being connected in series, through fluid conducting conduits and valves carrying a stream of said fluid from said fluid supply vessel, to
  (b) a liquid flow measuring means,
  (c) differential pressure flow control means for controlling the rate of flow of the liquid fluid and for decreasing the pressure on the fluid by a predetermined amount,
  (d) a vaporizer for completely vaporizing the fluid,
  (e) a mixer for intimately mixing the vaporized fluid with said gas, and
  (f) a reservoir for the product mixture;
(B) a gas supply vessel in which said gas is maintained under a pressure of from about 200 to about 2400 p.s.i.g. which is at least as high as the initial pressure in the supply vessel for said fluid,
  (a) said gas supply vessel being connected in series, through gas conducting conduits and valves carrying a stream of said gas from said gas supply vessel, to
  (b) differential pressurse gas flow control means for controlling the rate of flow of the gas and for decreasing the pressure on the gas by a predetermined amount,
  (c) a gas flow measuring means, and
  (d) a junction with a conduit for the completely vaporized fluid between said vaporized and said mixer; and
(C) means for repressurizing said fluid supply vessel as required to restore the pressure therein when that pressure drops by 0.25 to about 1 p.s.i., which means include
  (a) valving means in the liquid conducting conduit between said fluid supply vessel and said liquid flow measuring means for interrupting the flow of liquid to said liquid flow measuring means,
  (b) second valving means upstream of said first valving means and coactuated to open when said first valving means is closed, and
  (c) a gas conducting conduit connecting said second valving means with the conduit which conducts the gas under pressure from the gas supply vessel to the differential pressure gas flow control means.

4. Apparatus for preparing a gaseous mixture of (1) a fluid having a normal boiling point in the range of −45° C. to +60° C. and a vapor pressure at 70° F. in the range of 4.4 to 140 p.s.i.a. and (2) a gas having a normal boiling point below −75° C. and a vapor pressure of at least about 200 p.s.i.a. at 70° F., in preselected proportions under a pressure in the range of 1 to about 2000 p.s.i.g., which apparatus comprises (A) a fluid supply vessel in which said fluid is maintained in liquid state under a pressure which initially is in the range of 11 to 2200 p.s.i.g.,
  (a) said fluid supply vessel being connected in series, through fluid conducting conduits and valves carrying a stream of said fluid from said fluid supply vessel, to
  (b) a liquid flow measuring means,
  (c) differential pressure flow control means for controlling the rate of flow of the liquid fluid and for decreasing the pressure on the fluid by a predetermined amount,
  (d) a vaporizer for completely vaporizing the fluid,
  (e) a mixer for intimately mixing the vaporized fluid with said gas, and
  (f) a reservoir for the product mixture;
(B) a gas supply vessel in which said gas is maintained under a pressure of from about 200 to about 2400 p.s.i.g. which is at least as high as the initial pressure in the supply vessel for said fluid,
  (a) said gas supply vessel being connected in series, through gas conducting conduits and valves carrying a stream of said gas from said gas supply vessel, to
  (b) differential pressure gas flow control means for controlling the rate of flow of the gas and for decreasing the pressure on the gas by a predetermined amount,
  (c) a gas flow measuring means, and
  (d) a junction with a conduit for the completely vaporized fluid between said vaporizer and said mixer; and (D) means for avoiding excessive pressures in said reservoir, which means comprises
  (a) a fluid isolation valve in the fluid conducting conduit between the differential pressure fluid flow control means and said vaporizer,
  (b) a gas isolation valve in the gas conducting conduit upstream of the differential pressure gas flow control means,
  (c) a pressure responsive switch connected to said reservoir and actuated by changes in pressure in the reservoir, and
  (d) means actuated by said pressure responsive switch to close said isolation valves when the pressure in the reservoir exceeds a preset maximum.

5. Apparatus for preparing a gaseous mixture of (1) a fluid having a normal boiling point in the range of −45° C. to +60° C. and a vapor pressure at 70° F. in the range of 4.4 to 140 p.s.i.a. and (2) a gas having a normal boiling point below −75° C. and a vapor pressure of at least about 200 p.s.i.a. at 70° F., in preselected proportions under a pressure in the range of 1 to about 2000 p.s.i.g., which apparatus comprises (A) a fluid supply vessel in which said fluid is maintained in liquid state under a pressure which initially is in the range of 11 to 2200 p.s.i.g.,
  (a) said fluid supply vessel being connected in series, through fluid conducting conduits and valves carrying a stream of said fluid from said fluid supply vessel, to
  (b) a liquid flow measuring means,
  (c) differential pressure flow control means for controlling the rate of flow of the liquid fluid and for decreasing the pressure on the fluid by a predetermined amount,
  (d) a vaporizer for completely vaporizing the fluid,
  (e) a mixer for intimately mixing the vaporized fluid with said gas, and
  (f) a reservoir for the product mixture;

(B) a gas supply vessel in which said gas is maintained under a pressure of from about 200 to about 2400 p.s.i.g. which is at least as high as the initial pressure in the supply vessel for said fluid,
  (a) said gas supply vessel being connected in series, through gas conducting conduits and valves carrying a stream of said gas from said gas supply vessel, to
  (b) differential pressure gas flow control means for controlling the rate of flow of the gas and for decreasing the pressure on the gas by a predetermined amount,
  (c) a gas flow measuring means, and
  (d) a junction with a conduit for the completely vaporized fluid between said vaporizer and said mixer;

(C) means for repressurizing said fluid supply vessel as required to restore the pressure therein when that pressure drops by 0.25 to about 1 p.s.i., which means include
  (a) valve controlled gas conducting conduits connecting said fluid supply vessel with the gas stream flowing under pressure from said gas supply vessel; and (D) means for avoiding excessive pressures in said reservoir, which means comprises
  (a) a fluid isolation valve in the fluid conducting conduit between the differential pressure fluid flow control means and said vaporizer,
  (b) a gas isolation valve in the gas conducting conduit upstream of the differential pressure gas flow control means,
  (c) a pressure responsive switch connected to said reservoir and actuated by changes in pressure in the reservoir, and
  (d) means actuated by said pressure responsive switch to close said isolation valves when the pressure in the reservoir exceeds a preset maximum.

References Cited by the Examiner

UNITED STATES PATENTS

| | | | |
|---|---|---|---|
| 2,663,166 | 12/1953 | Anderson | 62—49 X |
| 2,678,541 | 5/1954 | Sheen | 62—49 |
| 2,777,296 | 1/1957 | Schilling | 62—49 X |

LLOYD L. KING, *Primary Examiner.*

ROBERT A. O'LEARY, *Examiner.*